United States Patent Office 3,297,418
Patented Jan. 10, 1967

3,297,418

MAGNETIC THIN FILM ELEMENT AND METHOD OF MANUFACTURE

Stanley Firestone, Neptune, and Eugene J. Chabak, West Long Branch, N.J., assignors to the United States of America as represented by the Secretary of the Army No Drawing. Filed Apr. 24, 1964, Ser. No. 362,528
4 Claims. (Cl. 29—199)

The invention described herein may be manufactured and used by or for the Government for governmental purposes without the payment of any royalty thereon.

This invention relates in general, to thin magnetic film elements, and to their method of manufacture; and in particular, to magnetic film elements comprising a magnetically oriented thin film of nickel-cobalt-iron alloy containing one percent to five percent cobalt and with nickel to iron ratios ranging from 80 to 20 to 75 to 25 respectively, and to their method of manufacture.

It is known that thin magnetic film elements may be produced by vacuum deposition, cathode sputtering, or thermal decomposition of a suitable ferromagnetic material, such as an 80:20 nickel:iron alloy, on to suitable support substrates. The aforementioned techniques are not adequate in that equipment costs are high, processing times relatively long, there is a lack of sensitivity to process control, and it is difficult to produce films in large quantities by these techniques.

An object of this invention is to overcome the difficulties associated with the above techniques used in the manufacture of thin magnetic film elements. A further object of this invention is to provide a method of making a thin magnetic film element wherein the resulting element will have relatively higher flux densities and provide a greater signal output when used as the magnetic thin film element of various memory devices such as computer storage matrices, parametron logic devices, etc.

It has now been found that the aforementioned difficulties can be overcome and the above mentioned objectives attained by employing an electrochemical deposition method using a particular ferromagnetic material. According to the method, a non-conductive base substrate is first cleaned prior to the deposition upon it of a conductive substrate. Thereafter, the conductive substrate is deposited on the base substrate. Then, a magnetically oriented thin film of a nickel-cobalt-iron alloy containing one percent to five percent cobalt and with nickel to iron ratios ranging from 80 to 20 to 75 to 25, respectively, is electrochemically deposited on to the conductive substrate. The particular element geometry desired is formed by photo-resist masking techniques and removal of unwanted areas of alloy by etchants.

As the non-conductive base substrate, a variety of materials may be used such as glass, ceramics, plastics, and other similar non-conductive metals. The non-conductive base is cleaned for the deposition upon it of the conductive substrate by a variety of conventional means including chemical washing, etching, electropolishing, mechanical polishing, ultra-sonic cleaning, etc., or a combination of any of these methods. A conductive substrate such as copper, gold, silver, etc., is then deposited upon the base substrate by a variety of techniques including vacuum deposition, cathode sputtering, or chemical deposition. If necessary, an adhesion improving material such as chromium or manganese may be deposited between the conductive and base substrates. Then, the thin film of the nickel-cobalt-iron alloy is electrochemically deposited on the conductive substrate from an electrochemical bath. The electrolyte of the electrochemical bath is an aqueous solution containing salts and/or complexes of metals to be co-deposited and, if necessary, wetting agents, stress reducers, conductivity promoters, pH buffers, etc. The anode of the bath may be platinum, nickel, iron, or alloys, or combinations of individual metals. The cathode of the bath is the non-conductive base substrate bearing upon it the deposit of the conductive substrate. The bath temperature during the electrochemical deposition is maintained between 10° C. and 50° C.; the bath pH between 1 and 4, the current density in the 2 to 6 milliampere per square centimeter range, and the magnetic orientation of the thin film of nickel-cobalt-iron alloy induced by Helmholtz coils, permanent magnets, etc. If a well defined configuration is desired on the magnetic film element, it can be obtained with a masking technique using a light-catalyzed lacquer. In the instance where it is desired to use the magnetic thin film as an inductive element, one can simultaneously electrochemically deposit the magnetic alloy on both faces of the substrate. This insures the coincidence of magnetic axes on both faces and alleviates the problems of bonding two separate magnetic alloy films back to back.

The following example illustrates the technique used for the electrochemical deposit of a magnetic thin film of nickel-cobalt-iron alloy according to a preferred embodiment of the invention.

EXAMPLE

A chromium film, 1000 angstroms thick, is vacuum deposited on a clean glass microscope slide prior to gold metallizing. The gold film, 700 angstroms thick, is used as the cathode in the electrochemical deposition of a 3000 angstrom thick film of 74.1 percent nickel-2.7 percent cobalt-23.2 percent iron alloy. The electrochemical deposition process controls used are the following.

*Electrolyte bath make-up*

| Material: | Amount used in grams per liter of bath |
|---|---|
| Nickel sulphate ($NiSO_4.6H_2O$) | 207.9 |
| Cobalt sulphate ($CoSO_4.7H_2O$) | 1.15 |
| Iron sulphate ($FeSO_4.7H_2O$) | 5.97 |
| Soluble saccharin ($C_7H_4NaO_3S.2H_2O$) | 0.83 |
| Sodium lauryl sulphate ($NaC_{12}H_{25}SO_4$) | 0.42 |
| Sodium chloride (NaCl) | 9.7 |
| Boric acid ($H_3BO_3$) | 25.0 |

Bath pH—2.95
Bath temperature—20° C.
Anode—platinum
Current density—3 milliamperes per square centimeter
Plating time—5 minutes
Magnetic field for orientation—20 oersteds The magnetic properties of the resultant nickel-cobalt-iron alloy film compared to those of two nickel-iron alloy films prepared by the electrochemical deposition technique are shown in the following table.

TABLE

| Alloy | Loop* Amplitude (cm.) | $H_c$ (oe.) | $H_{cd}/H_c$ | $H_k$ (oe.) | $B_r/B_s$ | Thickness (A.) | Diam. of Elements |
|---|---|---|---|---|---|---|---|
| 74.1% Ni-2.7% Co-23.2% Fe | 2.33 | 1.35 | 0.82 | 3.7 | 0.99 | 3,000 | ¼ in. |
| 76% Ni-24% Fe | 1.05 | 1.65 | 0.86 | 4.0 | 0.97 | 2,850 | ¼ in. |
| 76% Ni-24% Fe | 1.89 | 1.85 | 0.84 | 3.9 | 0.99 | 3,350 | ¼ in. |

*At equal thickness and element size, the loop amplitude can be used as a qualitative measure of magnetic flux density.

In the above table Hc refers to the coercive force value as measured in oersteds; Hcd refers to the easy axis disturb; Hk refers to the anisotropy field as measured in oersteds; Br refers to the remanent flux density; and Bs refers to the saturation flux density. The thickness as measured in angstroms refers to the thickness of the magnetic thin film. The Diameter of Elements refers to the diameter of the magnetic thin film.

The electrochemical deposition method herein described for preparing magnetic thin film elements to be used in memory storage devices or as the inductive element in a parametron logic device offers practical advantages over other techniques such as vacuum deposition, in that the electrochemical deposition method is extremely sensitive to process control of alloy composition uniformity. The process control with a vacuum deposition type process is recognized as being poor. It should be noted that the vacuum process and equipment are very complex and expensive while the electrochemical deposition method and equipment are very simple and inexpensive. Furthermore, electrochemical deposition methods readily lend themselves to automatic mass assembly production techniques while vacuum deposition methods do not.

It can be seen from the table that the thin magnetic film elements made according to the invention can reduce the power requirements for memory storage devices and parametron logic devices. In the case of the parametron logic device, by using a conductive substrate both as conductor for the pump current and as the substrate for the thin magnetic film, further power reduction can be effected by this close coupling between the pump strip and the magnetic film. This is an obvious improvement over present devices which use separate magnetic thin film (inductor) and pump strip components.

The foregoing description is to be considered merely as illustrative of the invention and not in limitation thereof.

What is claimed is:

1. A method of forming a thin magnetic film element comprising the use of an electrochemical bath in the presence of an orienting magnetic field of 20 oersteds for electrochemically depositing a magnetically oriented thin film containing 74.1 percent nickel-2.7 percent cobalt-23.2 percent iron alloy onto a glass substrate bearing a gold film, said electrochemical bath including (A) a platinum anode; (B) said glass substrate bearing the gold film as the cathode; and (C) an electrolyte composed of the following materials with their respective amounts:

| Material: | Amount used in grams per liter of bath |
|---|---|
| Nickel sulphate ($NiSO_4.6H_2O$) | 207.9 |
| Cobalt sulphate ($CoSO_4.7H_2O$) | 1.15 |
| Iron sulphate ($FeSO_4.7H_2O$) | 5.97 |
| Soluble saccharin ($C_7H_4NaO_3S.2H_2O$) | 0.83 |
| Sodium lauryl sulphate ($NaC_{12}H_{25}SO_4$) | 0.42 |
| Sodium chloride (NaCl) | 9.7 |
| Boric acid ($H_3BO_3$) | 25.0 |

and wherein the bath temperature during the electrochemical deposition is maintained at 20° C., the bath pH at 2.95, the current density at 3 milliamperes per square centimeter and wherein the deposition time is 5 minutes.

2. A thin magnetic film element comprising a magnetically oriented thin film containing 74.1 percent nickel-2.7 percent cobalt-23.2 percent iron alloy deposited on a gold substrate.

3. A thin magnetic film element, comprising a magnetically oriented film, said film being an alloy consisting essentially of 1 to 5 percent cobalt, and the remainder of said magnetically oriented film being nickel and iron in a ratio of from 80:20 to 75:25, said magnetically oriented film being deposited on an electrically conductive metallic substrate.

4. The invention according to claim 3, wherein said substrate is a member selected from the group consisting of gold, silver, and copper.

References Cited by the Examiner

UNITED STATES PATENTS

| | | | |
|---|---|---|---|
| 2,970,296 | 1/1961 | Horton | 156—24 X |
| 2,990,343 | 6/1961 | Safranek | 204—43 |
| 3,119,753 | 1/1964 | Mathias et al. | 204—43 |
| 3,193,418 | 7/1965 | Cooper et al. | 156—17 X |

A. WYMAN, *Primary Examiner.*

JACOB H. STEINBERG, *Examiner.*